May 7, 1957          H. M. NORMAN          2,791,735
DYNAMICALLY BRAKED POLYPHASE INDUCTION MOTOR
Filed Jan. 11, 1956          2 Sheets-Sheet 1
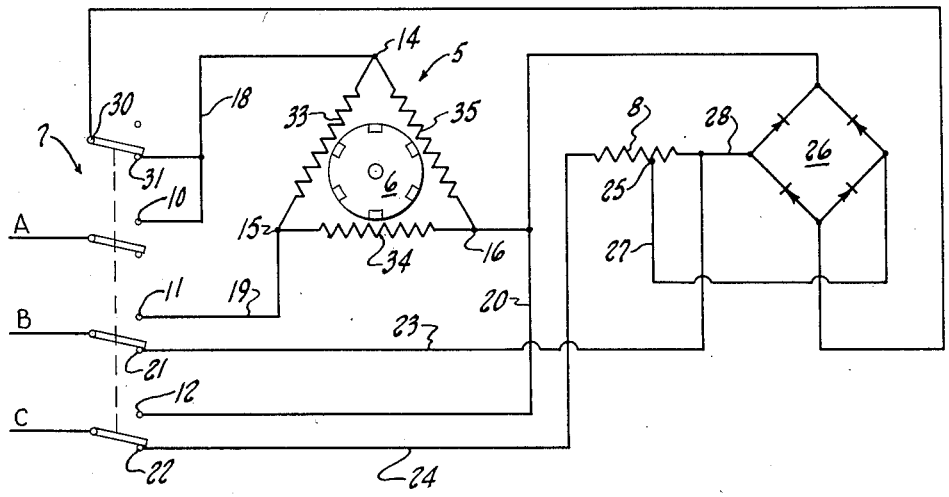
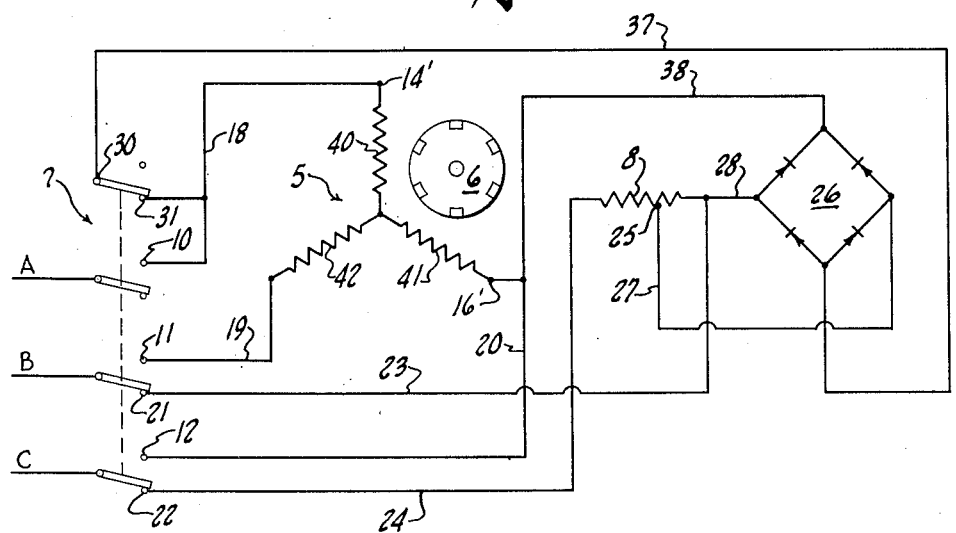
Inventor
Horace M. Norman
By
Attorney United States Patent Office 2,791,735
Patented May 7, 1957

2,791,735

DYNAMICALLY BRAKED POLYPHASE INDUCTION MOTOR

Horace M. Norman, West Allis, Wis., assignor to The Louis Allis Company, Milwaukee, Wis., a corporation of Wisconsin Application January 11, 1956, Serial No. 558,518

5 Claims. (Cl. 318—211)

This invention relates to dynamic braking of polyphase induction motors of the type which are provided with squirrel cage rotors.

The copending application of Horace M. Norman, Serial No. 480,897, filed January 10, 1955, describes a motor having a squirrel cage rotor and a stator winding which may be energized by polyphase current in the usual manner, for motoring, or which may be energized with alternating current in another manner to effect positive deceleration of the rotor with a substantial braking torque. For dynamic braking to a complete stop, a motor embodying the principles of said copending application had to have a rotor affording relatively high effective resistance when the stator winding was energized for braking. While successful motors have been built in accordance with those principles, which motors could be braked to a full stop when they were new, it sometimes happened that after such a motor had become several months old it tended to "hang up" at a very low R. P. M. during braking energization, rather than coming to a complete stop, even though its rotor had been flame treated during manufacture is an effort to stabilize its characteristics. The exact cause of this phenomenon is not definitely known, but whatever the cause, it manifested itself in a change in the effective resistance of the rotor at least at times when braking energization was applied to the stator winding.

While this tendency to rotate at a very low R. P. M. was not objectionable in motors intended for certain applications (e. g., sirens), it was undesirable in many cases where the rotor had to be dynamically brought to a stop. Accordingly, it is an object of this invention to provide a dynamically braked polyphase induction motor having a rotor of the squirrel cage type wherein the effective resistance of the rotor during dynamic braking is not critical, so that any change in effective rotor resistance due to aging of the machine will not impair its dynamic braking characteristics.

Another object of the present invention resides in the provision of a polyphase motor of the type having a squirrel cage rotor, which motor incorporates simple, inexpensive and very efficient means for braking the rotor to a full stop and capable of providing a high braking torque at low speeds.

A further object of this invention resides in the provision of a dynamically braked electric motor of the type having a squirrel cage rotor, wherein a direct current is applied to the motor winding during braking, and wherein such direct current is supplied by simple and inexpensive means, including a small rectifier.

A further object of the present invention resides in the provision of a dynamically braked electric motor of the character described wherein the stator winding is in part reconnectable for either polyphase motoring operation or for dynamic braking, and wherein the number of leads from the winding is kept to a desirable minimum.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 1 is a circuit diagram of a motor having a delta connected winding and incorporating the principles of this invention, said motor being shown with its control switch in the position for dynamic braking;

Figure 2 is a circuit diagram similar to Figure 1 but showing a motor having a star connected stator winding.

Figure 3:
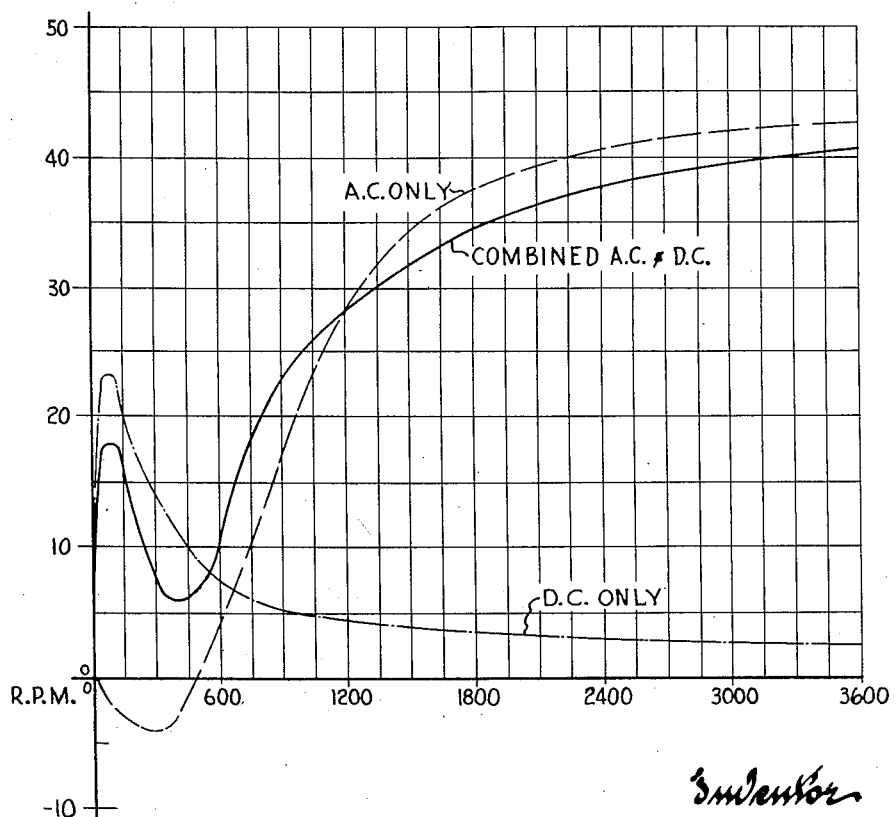
Figure 3 is a plot of the braking torque curves of a typical motor embodying the principles of this invention.

Referring now to the accompanying drawings, the numeral 5 designates generally a delta connected stator winding of a motor having a squirrel cage rotor 6 of conventional type. For motoring operation this winding is connected, through a four-pole double-throw switch 7 with mains A, B, C providing a source of three phase alternating current.

To provide for dynamic braking of the motor the stator has additional coils providing a braking winding 8, and when the switch 7 is thrown to the position shown in Figure 1 it connects the braking winding with two of the polyphase alternating current leads B, C to thereby provide for energization of the braking winding with single phase A. C. Simultaneously, of course, the delta connected motoring winding is disconnected from the polyphase A. C. source, but during braking it is energized by direct current, which is preferably of substantially lower voltage than that of the A. C. applied to the braking winding 8. It will be seen that the winding normally energized for motoring thus serves as a second braking winding during dynamic braking.

More specifically, when the switch is in its position for motoring operation its terminals 10, 11, 12 are respectively connected with the leads A, B, C of the polyphase mains, and the three terminals 14, 15, 16 of the motoring winding are thereby connected with the mains through conductors 18, 19, 20. This is of course the conventional circuit for motoring with a delta connected stator winding.

When the switch 7 is thrown to its braking position (shown in Figure 1) the motoring winding is disconnected from the polyphase A. C. mains and the braking winding 8 is energized with single phase A. C. from leads A, B through switch terminals 21, 22 and conductors 23, 24.

While the direct current employed for braking energization of the motoring winding may be obtained from any desired source, this invention makes possible the employment of the very inexpensive means for deriving such direct current now about to be described. Since with this invention only a relatively small D. C. is required to be applied to the motoring winding for effective braking, the low D. C. voltage needed may be obtained by means of a tap 25 on the braking coil, near one end thereof, connected with a rectifier bridge network 26 by means of conductors 27, 28 in such a manner that the braking coil functions like an auto transformer. With either 220 volt or 440 volt mains, the braking winding can be so tapped as to provide a voltage less than the breakdown voltage of an average rectifier plate, and which is quite adequate, when rectified and applied to the motor winding, to provide effective braking.

The D. C. circuit to the motoring winding is closed only during braking, switch terminals 30, 31 being provided to disconnect the motoring winding from the rectifier network during motoring energization of winding 5 with three-phase current.

If desired, a half-wave rectifier may be employed instead of the full wave rectifier bridge circuit shown.

It will be observed that direct current is applied to the motoring winding at terminals 14 and 16 thereof, and consequently the three legs of the delta connected stator winding are not energized by currents of equal magnitude. In other words the direct current applied to terminals 14 and 16 energizes legs 33 and 34 of the delta connected winding in series with one another, while the single leg 35 connected between those terminals will draw twice as much current as the legs 33 and 34. This, however, makes no difference in the braking operation of the machine because the field due to the direct current energization is a stationary one.

The application of the invention to a motor having a star connected winding is essentially the same as that for a delta connected motor as described above, and is illustrated in Figure 2. In this case direct current from the rectifier bridge network 26 is applied, via conductors 37 and 38 and switch terminals 30, 31 to two of the outer terminals 14' and 16' of the star connected winding 5' so that two legs 40, 41 of the star connected winding are energized in series with one another, while no current flows through the third leg 42. Again, because the D. C. field is stationary the fact that the leg 42 is not energized is of no significance.

As hereinbefore mentioned a dynamically braked motor embodying the principles of the above identified copending application required a rotor having a high effective resistance in order to obtain braking torque at very low speeds. To this end the number of brake poles was made substantially larger than the number of motor poles, and the rotor bars were skewed through an arc equivalent to 1.15 to 1.65 times the brake pole arc to provide an optimum effective rotor resistance during braking without substantially affecting motoring performance. As hereinbefore brought out, this expedient sometimes did not prove to be fully effective, particularly after the motor had aged several months.

With a motor of the present invention some amount of rotor skew is desirable, but braking to a full stop is not critically dependent upon the amount of rotor skew, and consequently there is no risk of incurring a penalty in motor performance in order to obtain adequate braking. In Figure 3 are shown the curves of braking torque of a typical 7.5 H. P. 3600 R. P. M. motor embodying the principles of the present invention, operated for motoring on 60-cycle 3-phase 220 volt A. C. and having a rotor skew of 1.1 times the brake pole arc. It will be observed that upon the application of A. C. to the brake winding only, with no energization of the normal motor winding, substantial braking torque is produced throughout the highest R. P. M. range. However, as the rotor slows to a speed at and below the synchronous speed corresponding to the number of braking poles provided by the braking winding, braking torque falls off rapidly, and in the low speed range the A. C. energization is responsible for a negative braking (i. e., motoring) torque.

However, energization of the motoring winding with D. C., to provide a second brake winding, produces a braking torque which supplements that afforded by the A. C. energized braking winding 8. The D. C. produced braking torque has a relatively low value at those high speeds at which A. C. braking torque is most effective, but as the effectiveness of the A. C. produced braking torque falls off, with decreasing R. P. M., there is a substantial rise in the braking torque produced by the D. C. energized motor winding. In consequence, the composite curve of braking torque, for braking due to energization of both windings, shows a drop-off of torque with decreasing R. P. M., down to a low rotor speed, which drop-off, however, is not at an objectionably fast rate, followed by a rapid rise of braking torque with further decreasing R. P. M. until the rotor has slowed down to a very low R. P. M., after which braking torque abruptly but smoothly decreases as the rotor is brought to a full stop. It will be observed that with the rotor at rest the brake winding fields exert a slight resistance to rotation of the rotor.

From the foregoing description taken together with the accompanying drawings it will be apparent that this invention provides a dynamically braked polyphase induction rotor of the type having a squirrel cage rotor and which provides simple, efficient means for assuring dynamic braking of the rotor to a full stop.

What I claim as my invention is:

1. In a dynamically braked polyphase motor having a squirrel cage rotor and a stator with coils wound thereon and providing a motor winding connectable with a polyphase alternating current to produce a number of motor poles and a field which rotates in one direction: means for connecting some of the coils on the stator in groups and with a single phase alternating current (non-concurrently with polyphase A. C. energization of the motor winding) to produce a number of brake poles and the effect of a pair of fields which rotate in opposite directions; means, including a tap on said last designated coils, for providing a source of single phase alternating current at a voltage substantially lower than that obtaining across said other coils; means including a rectifier for converting low voltage single phase A. C. from said source to direct current; and means for applying direct current from said last named means to other coils on the stator concurrently with energization of the brake poles, to produce a fixed field which supplements the braking effect of said oppositely rotating fields, whereby the rotor may be braked to a stop.

2. In a dynamically braked polyphase motor having a squirrel cage rotor and a stator with coils wound thereon: means for connecting coils on the stator in groups and with a polyphase alternating current to provide a motor winding having a number of motor poles and a field which rotates in one direction; means for connecting other coils on the stator in groups and with a single phase alternating current (non-concurrently with polyphase A. C. energization of the motor winding) to produce a number of brake poles and the effect of a pair of fields which rotate in opposite directions; and means for applying a direct current to said motor winding concurrently with energization of said other coils to produce a fixed field which supplements the braking effect of said oppositely rotating fields, whereby the rotor may be braked to a stop.

3. The dynamically braked polyphase motor of claim 2, wherein said means for applying a direct current to the motor winding comprises: a tap on said other coils for providing a source of alternating current at a voltage substantially lower than that of the single phase A. C. applied across said other coils; and a rectifier connected with said tap for rectifying the low voltage A. C. thus obtained.

4. In a dynamically braked polyphase motor having a squirrel cage rotor and having a stator with a motor winding adapted to be energized for motoring operation by polyphase current: a braking winding on the stator, separate from and in addition to the motor winding; means for energizing said braking winding, non-concurrently with energization of the motor winding, by a single phase alternating current; and means for energizing the motor winding with a direct current when that said braking winding is energized.

5. In a dynamically braked polyphase motor having a squirrel cage rotor and having a stator with coils wound thereon and adapted to be connected in groups to provide a motor winding which may be energized for motoring operation by a polyphase current: means for connecting some of the coils on the stator in groups to provide a first brake winding; means for energizing said first brake winding with single phase alternating current at times when the motor winding is not energized for motoring operation, to produce a number of poles and the effect of a pair of fields rotating in opposite directions; means for connecting other coils on the stator in groups to provide a second brake winding; and means for energizing said second brake winding with direct current when that said first brake winding is energized.

References Cited in the file of this patent
UNITED STATES PATENTS 2,677,087     Willmott _____ Apr. 27, 1954